US010725246B1

(12) United States Patent
Liu

(10) Patent No.: US 10,725,246 B1
(45) Date of Patent: Jul. 28, 2020

(54) OPTICAL FIBER ADAPTER

(71) Applicant: ACSUPER TECHNOLOGIES INC., Miaoli County OT (TW)

(72) Inventor: Mei Miao Liu, Taipei (TW)

(73) Assignee: ACSUPER TECHNOLOGIES INC., Miaoli County (TW)

( * ) Notice: Subject to any disclaimer, the term of this patent is extended or adjusted under 35 U.S.C. 154(b) by 0 days.

(21) Appl. No.: 16/554,641

(22) Filed: Aug. 29, 2019

Related U.S. Application Data

(60) Provisional application No. 62/838,298, filed on Apr. 24, 2019.

(51) Int. Cl.
*G02B 6/38* (2006.01)

(52) U.S. Cl.
CPC ......... *G02B 6/3825* (2013.01); *G02B 6/3806* (2013.01); *G02B 6/3809* (2013.01); *G02B 6/3821* (2013.01); *G02B 6/3846* (2013.01); *G02B 6/3865* (2013.01); *G02B 6/3882* (2013.01); *G02B 6/3893* (2013.01)

(58) Field of Classification Search
CPC ... G02B 6/3821; G02B 6/3825; G02B 6/3893
See application file for complete search history.

(56) References Cited

U.S. PATENT DOCUMENTS

| | | | | |
|---|---|---|---|---|
| 8,821,031 B2* | 9/2014 | Lin | ...................... | G02B 6/3825 |
| | | | | 385/59 |
| 9,453,963 B2* | 9/2016 | Sato | ........................ | G02B 6/241 |
| 9,618,715 B1 | 4/2017 | Yang et al. | | |
| 9,632,256 B2* | 4/2017 | Yang | .................... | G02B 6/3825 |
| 10,502,903 B1* | 12/2019 | Wang | .................... | G02B 6/3825 |
| 10,502,904 B2* | 12/2019 | Yang | .................... | G02B 6/3825 |
| 2010/0054665 A1* | 3/2010 | Jones | .................... | G02B 6/3825 |
| | | | | 385/59 |

* cited by examiner

Primary Examiner — Daniel Petkovsek

(57) ABSTRACT

An optical fiber adapter includes a main body, an inner housing, a movable shutter, a latch element, a spring and a cover. The inner housing is disposed in an axial accommodation room of the main body. The movable shutter includes a shutter portion, a pivot portion and a first interference structure. The first interference structure is disposed on the pivot portion, the pivot portion is rotatably disposed in the axial accommodation room, and the shutter portion placed in front of the hollow cylinder of the inner housing. The latch element includes a pushed portion, a cantilever portion and a second interference structure. The latch element is linearly movable in the axial accommodation room. The spring is disposed in the axial accommodation room and abuts against the latch element. The optical fiber adapter may shield high-intensity light by using movable shutter to protect eyes from damage.

16 Claims, 9 Drawing Sheets

OPTICAL FIBER ADAPTER

FIELD OF THE INVENTION

The present invention relates to an optical fiber adapter, and more particularly to an optical fiber adapter having a light-shielding member.

BACKGROUND OF THE INVENTION

Optical fiber has been widely used as a transmission medium for signals in recent years. A fiber optic connector and a fiber optic adapter can be used if two optical fibers are required to be connected with each other. In general, the fiber optic connectors are disposed at the two ends of the fiber and can be inserted into the opening of the fiber optic adapter. The fiber optic adapter has two openings, and each opening is connected with one fiber optic connector. In order to transmit the signal to a greater distance, the energy coupled to optical fiber is increased greatly. When a high-intensity infrared beam is emitted from one end of the fiber, permanent damage to the vision of a user is often caused if the user's eyes are inadvertently exposed directly to the beam.

U.S. Pat. No. 9,618,715 discloses a fiber optic adapter having a light-shielding member. In addition to shielding a high-intensity infrared beam, the light-shielding member can also be used to prevent dust from entering the optical fiber adapter to solve the dust-proof problem. However, the light-shielding member cannot be applied to a fiber optic adapter with a hook, and therefore it is not practical.

SUMMARY OF THE INVENTION

The present invention provides a fiber optic adapter that can shield light emitted from an axial accommodation room to prevent the vision from being damaged. In addition, the fiber optic adapter can be mated with a plurality of types of fiber optic connectors by the design of the latch element.

The invention provides an optical fiber adapter adapted to be connected with an optical fiber connector. The optical fiber adapter includes a main body, an inner housing, at least one movable shutter, at least one latch element, at least one spring and an upper cover plate. The main body has an axial accommodation room. The axial accommodation room is formed by a top wall, a bottom wall and two side walls opposite to each other. The two side walls are connected to the top wall and the bottom wall. Two axial ends of the axial accommodation room have a first opening and a second opening respectively. An upper access opening is formed on the top wall. The inner housing is disposed in the axial accommodation room. The inner housing includes a first inner housing element and a second inner housing element. The first inner housing element includes at least one first hollow cylinder facing the first opening. The second inner housing element includes at least one second hollow cylinder facing the second opening. The movable shutter includes a shutter portion, a pivot portion and a first interference structure. The shutter portion is connected to the pivot portion. The first interference structure is disposed at the pivot portion. The pivot portion is rotatably disposed in the axial accommodation room, and the shutter portion is placed between the first hollow cylinder and the first opening. The latch element includes a pushed portion, a cantilever portion and a second interference structure. The pushed portion is disposed at an end of the cantilever portion. A containing space is formed between the cantilever portion and the pushed portion. The second interference structure is disposed at the cantilever portion. The latch element is linearly movable and disposed in the axial accommodation room. The second interference structure and the first interference structure interfere with each other. The spring is disposed in the axial accommodation room and abutted against the latch element. The upper cover plate covers the upper access opening.

In an embodiment of the present invention, the latch element moves in a direction toward the second opening and compresses the spring when the pushed portion is pushed by the optical fiber connector. By a movement of the second interference structure on the latch element, the first interference structure is actuated and drives the pivot portion to rotate, so that the shutter portion is deflected away from the first hollow cylinder and accommodated in the containing space.

In an embodiment of the present invention, when the optical fiber connector is disconnected from the pushed portion, the spring pushes the latch element to move in a direction toward the first opening by restoring force thereof, and the shutter portion is deflected back between the first hollow cylinder and the first opening.

In an embodiment of the present invention, the latch element is linearly movable and disposed in the axial accommodation room and between the upper cover plate and the inner housing. The cantilever portion of the latch element is disposed with an axial accommodation slot for accommodating at least a part of the spring, and the spring is located between the upper cover plate and the latch element.

In an embodiment of the present invention, the bottom wall of the main body is further formed with a lower access opening. The optical fiber adapter further includes a lower cover plate covering the lower access opening. The latch element is linearly movable and disposed in the axial accommodation room and is located between the lower cover plate and the inner housing. The latch element is disposed with an axial accommodation slot for accommodating at least a part of the spring, and the spring is located between the lower cover plate and the latch element.

In an embodiment of the present invention, the upper cover plate has an inner surface facing the upper access opening. At least one positioning slot is formed on the inner surface of the upper cover plate and corresponding to a position of the spring. The upper cover plate covers the upper access opening and accommodates the spring by the positioning slot.

In an embodiment of the present invention, the first interference structure includes a protrusion structure formed on the pivot portion. The second interference structure includes an opening formed on the cantilever portion. The protrusion structure passes through the opening, and at least one inner wall of the opening interferes with the protrusion structure.

In an embodiment of the present invention, the first interference structure includes a gear structure formed on at least a part of the pivot portion. The second interference structure includes a rack structure formed at the cantilever portion. The rack structure is meshed with the gear structure.

In an embodiment of the present invention, the cantilever portion of the latch element has two axial side surfaces opposite to each other. The second interference structure includes two side arms disposed on and protruding from the two axial side surfaces respectively. The first interference structure includes two seesaw members disposed at two opposite ends of the pivot portion respectively. Each of the seesaw members is divided into a first section and a second section by the pivot portion as a fulcrum. The first section abuts against the side arm, and the second section is connected to the shutter portion.

In an embodiment, the latch element further includes a spring sheet disposed in the axial accommodation room, and a part of the spring sheet is disposed through and located between the shutter portion and the cantilever portion.

In an embodiment of the present invention, the cantilever portion of the latch element has two axial side surfaces opposite to each other. The second interference structure includes two side arms and two convex pillars. Each of the axial side surfaces is disposed with the side arm and the convex pillar. An interval is formed between the convex pillar and the respective side arm. The first interference structure includes two interference members disposed at two opposite ends of the pivot portion respectively. Each of the interference members includes a first section and a second section. The first section and the second section are connected to each other in a V-shape manner to form a limiting space between the first section and the second section. The first section is disposed in the interval, and the convex pillar is located in the limiting space.

In an embodiment of the present invention, the top wall of the main body is disposed with at least one locking window adjacent to the first opening. The at least one locking window is adapted to connect and interfere with the optical fiber connector.

In an embodiment of the present invention, at least one hook portion is formed on the cantilever portion of the latch element. The at least one hook portion is adapted to connect and interfere with the optical fiber connector.

In an embodiment of the present invention, the top wall of the main body is disposed with at least one partition wall facing the bottom wall to divide the axial accommodation room into a plurality of sub-accommodation rooms. Quantities of the first hollow cylinders and the second hollow cylinders are plural. Each of the sub-accommodation rooms is respectively disposed with at least one first hollow cylinder and at least one second hollow cylinder. Quantities of the latch elements and the movable shutters are plural. Each of the sub-accommodation rooms is disposed with at least one latch element and at least one movable shutter. A quantity of the springs is plural, and the springs are disposed in the sub-accommodation rooms respectively for abutting against the latch elements respectively.

In an embodiment of the present invention, each of the sub-accommodation rooms has two surfaces opposite to each other. An axial guiding protrusion is formed on the two surfaces respectively. The two axial guiding protrusions of the two surfaces are opposite to each other. An erection portion is disposed on the two axial guiding protrusions respectively. The two erection portions of the two axial guiding protrusions are opposite to each other. A slot is formed on the two erection portions respectively. Two opposite end portions of the pivot portion of each of the movable shutters corresponding to the respective sub-accommodation room are actuated and disposed in the slots respectively, and the latch element is actuated and disposed between the two axial guiding protrusions.

In an embodiment of the present invention, a plurality of guide portions are disposed parallel on a top portion of the first inner housing element. The guide portions face the first opening and are spaced from each other. Each two adjacent guide portions has two opposite surfaces. A guide slot is disposed on the two opposite surfaces respectively. Two ends of the pivot portion of each of the movable shutters are actuated and disposed in the guide slots respectively. The latch element is actuated and disposed between the two adjacent guide portions.

In an embodiment of the present invention, a block portion is respectively disposed on the two opposite surfaces of each two adjacent guide portions and adjacent to the second inner housing element. The two block portions of each two adjacent guide portions are opposite to each other to form a first notch. A top portion of the second inner housing element is formed with a plurality of second notches. The second notches correspond to the first notches. The spring is placed on the first notch and the second notch corresponding to each other, and the spring is abutted against the latch element.

In the present invention, the latch element is disposed between the main body and the cover plate. The movable shutter can be controlled to be deflected to the containing space of the latch element and expose the hollow cylinder by the linear movement of the latch element in the axial accommodation room, and thereby facilitating the connection with the optical fiber adapter. Further, when the optical fiber connector is disconnected from the optical fiber adapter, the movable shutter returns back to the initial position for to shield the hollow cylinder, so that the high intensity infrared beam is blocked and the visual damage to the user can be avoided. By the design of the latch element having a hook portion, the optical fiber adapter can be connected to a plurality of types of optical fiber connectors, and therefore the practicality of the optical fiber adapter of the present invention is high. That is, the optical fiber adapter can be connected to more types of optical fiber connectors via the latch elements having different structures. Further, by disposing the latch element between the cover plate and the main body, the tightness between the cover plate and the main body can be increased.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
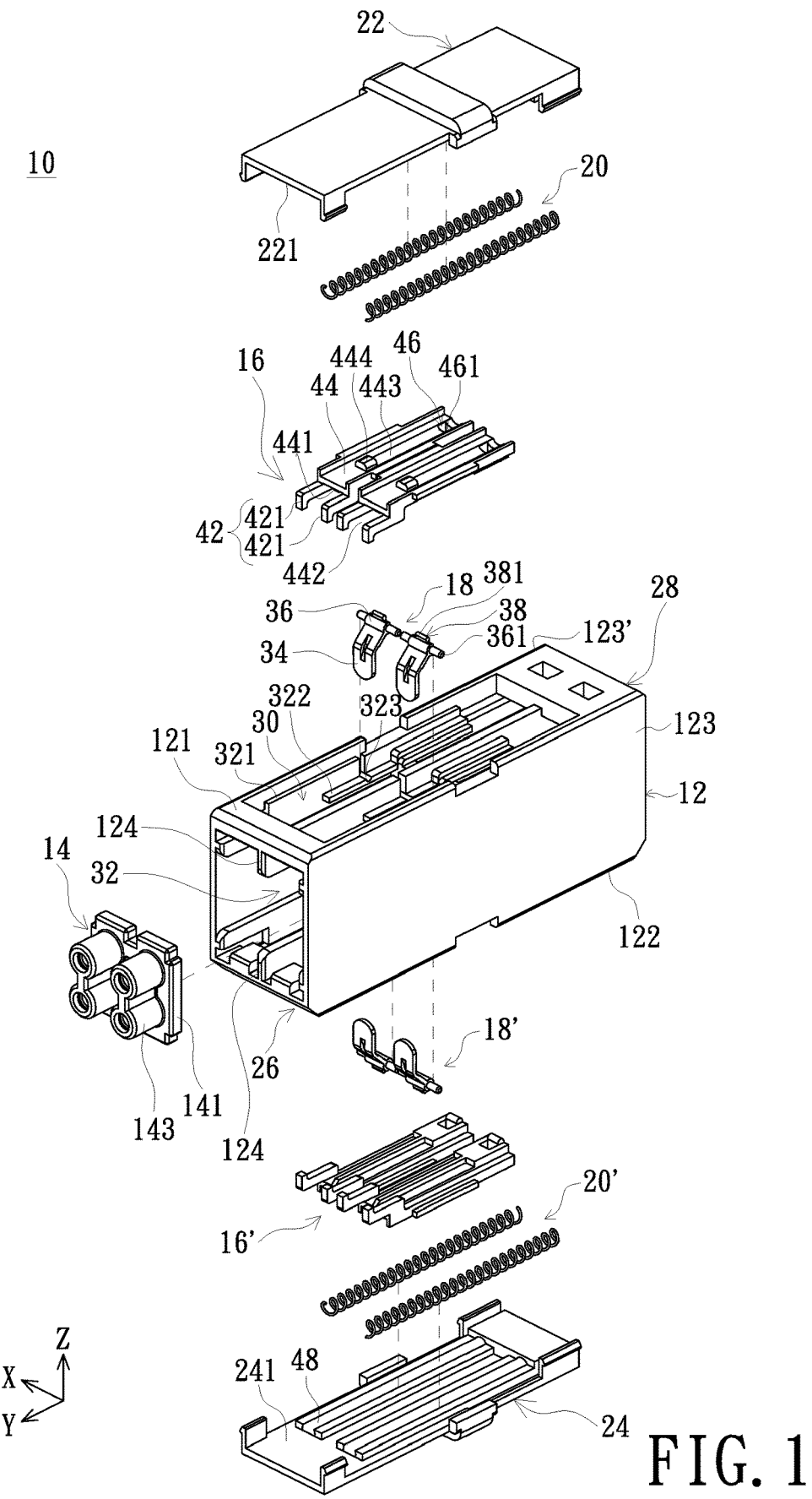
FIG. 1 is a schematic perspective exploded diagram of an optical fiber adapter according to a first embodiment of the invention.
Figure 2:
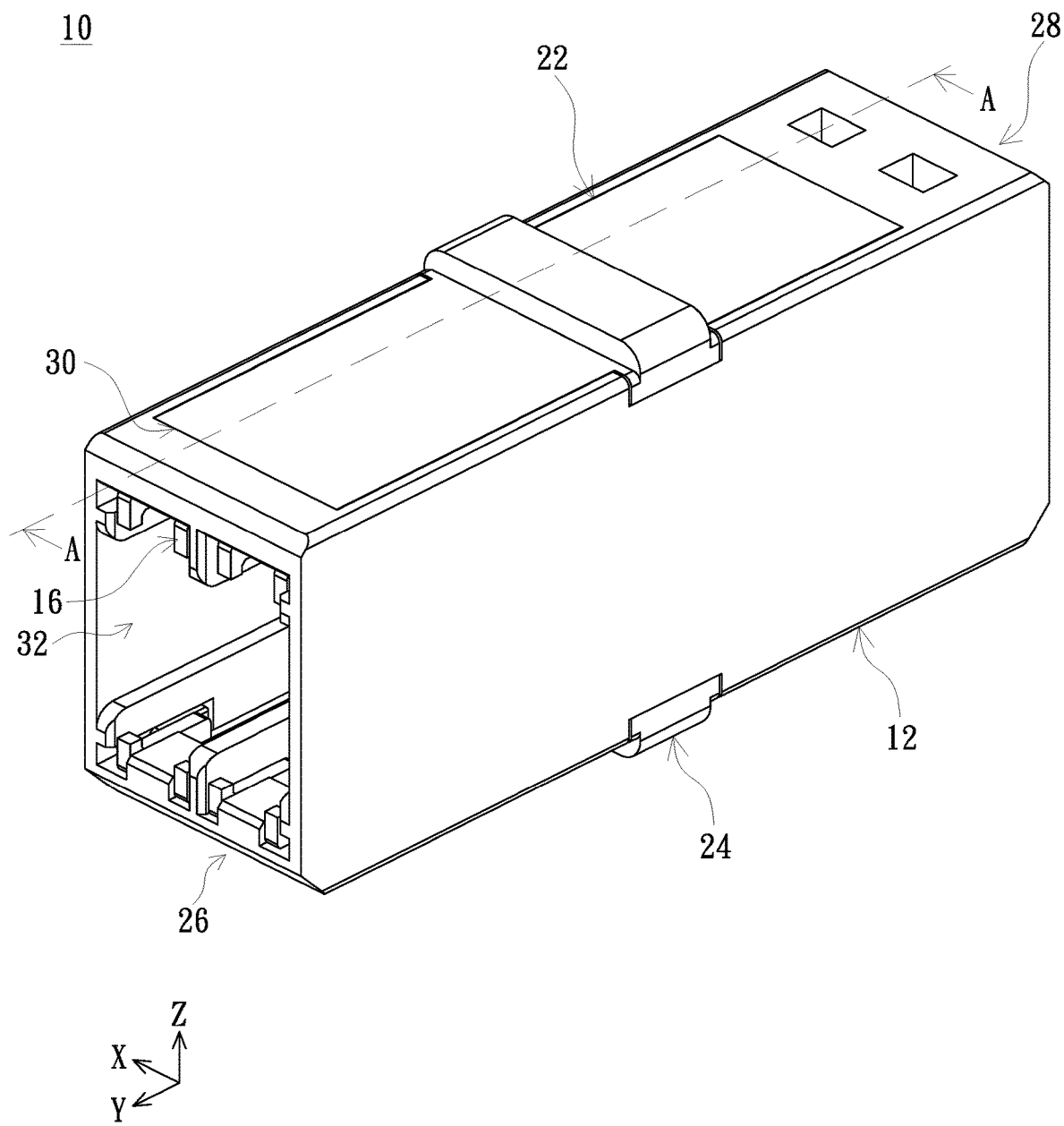
FIG. 2 is a schematic diagram of an assembly of an optical fiber adapter according to a first embodiment of the invention.
Figure 3:
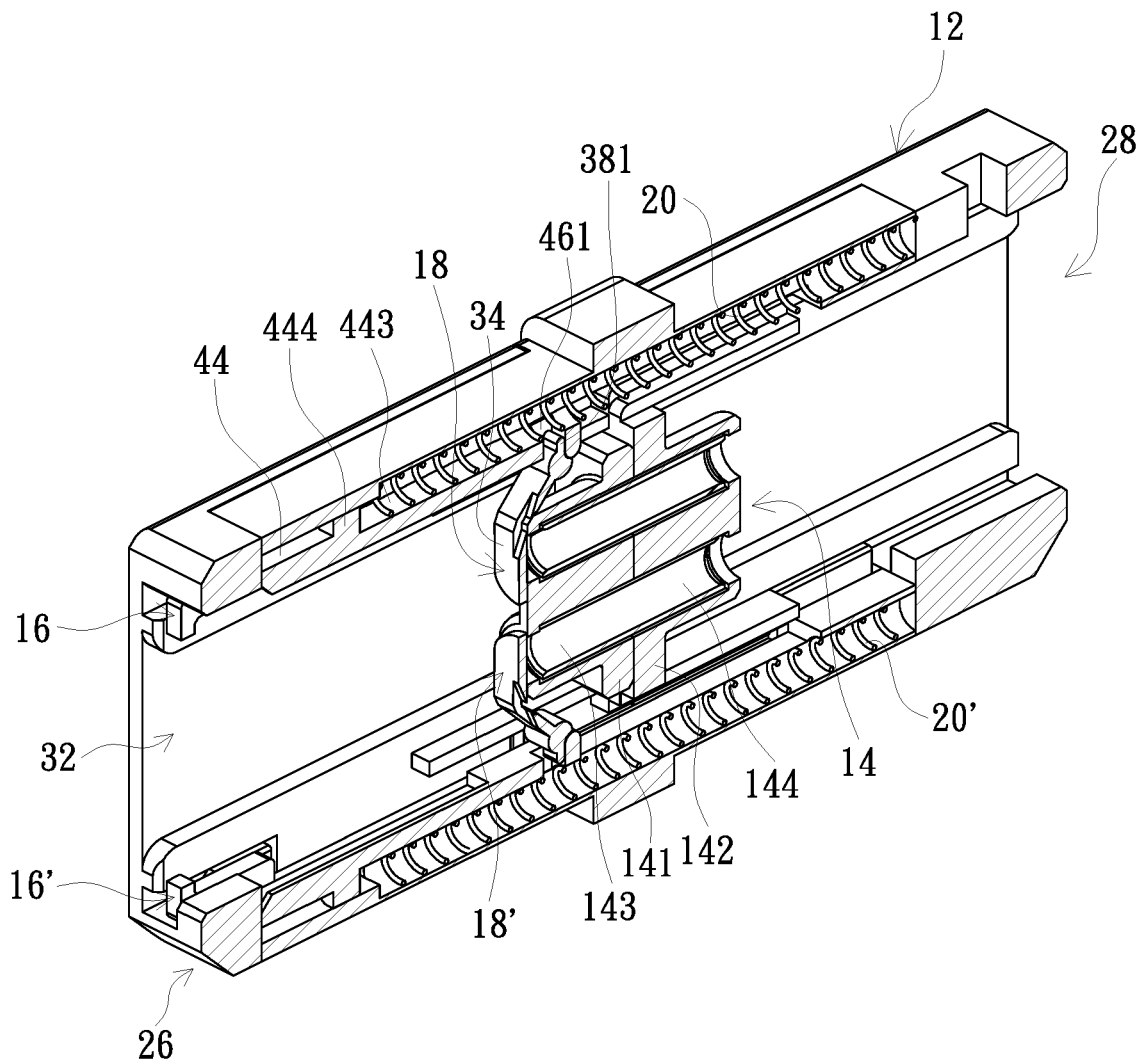
FIG. 3 is a schematic perspective cross-sectional diagram of the optical fiber adapter taken along the line A-A in FIG. 2.
Figure 4:
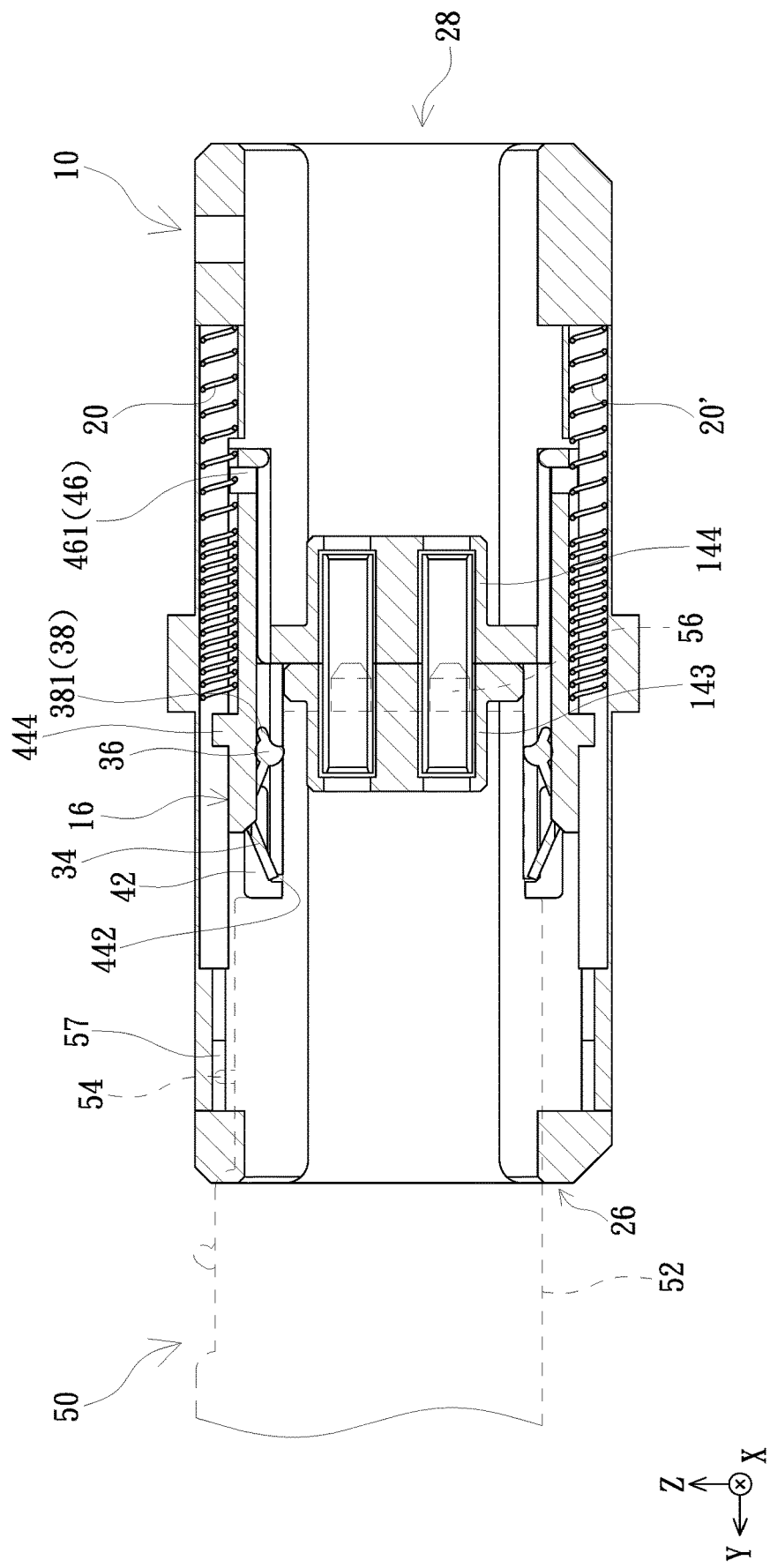
FIG. 4 is a schematic diagram of an optical fiber adapter connected with an optical fiber connector according to a first embodiment of the invention.

FIG. 1 is a schematic perspective exploded diagram of an optical fiber adapter according to a first embodiment of the invention. FIG. 2 is a schematic diagram of an assembly of an optical fiber adapter according to a first embodiment of the invention. FIG. 3 is a schematic perspective cross-sectional diagram of the optical fiber adapter taken along the line A-A in FIG. 2. FIG. 4 is a schematic diagram of an optical fiber adapter connected with an optical fiber connector according to a first embodiment of the invention. As shown in FIGS. 1, 2 and 3, the optical fiber adapter 10 includes a main body 12, an inner housing 14, latch elements 16, 16', movable shutters 18, 18', springs 20, 20', an upper cover plate 22 and a lower cover plate 24. The main body 12 has an axial accommodation room (not labeled). The axial accommodation room may extend, for example, along the Y-axis direction and is formed by a top wall 121, a bottom wall 122 and two opposite side walls 123, 123'. The top wall 121 and the bottom wall 122 are opposite to each other, and the top wall 121 and the bottom wall 122 are connected to the two opposite side walls 123, 123'. The two axial ends of the axial accommodation room have a first opening 26 and a second opening 28 respectively. The top wall 121 and the bottom wall 122 are formed with an upper access opening 30 and a lower access opening (not shown in the figures) respectively, wherein the upper access opening 30 corresponds to the lower access opening.

Continue with the above description. In an embodiment as shown in FIG. 1, the opposite inner surfaces of the top wall 121 and the bottom wall 122 are disposed with opposite partition walls 124 to partition the axial accommodation room into two sub-accommodation rooms 32. Each of the sub-accommodation rooms 32 may extend, for example, along the Y-axis direction. In an embodiment, the sub-accommodation room 32 is formed by the partition walls 124 and the side wall 123/123' of the main body 12. The opposite surfaces of the partition wall 124 and the side wall 123/123' are respectively formed with axial guiding protrusions 321 opposite to each other. The opposite axial guiding protrusions 321 are respectively disposed with erection portions 322 opposite to each other, and each of the erection portions 322 is formed with a slot 323. In an un-illustrative embodiment, when a quantity of the sub-accommodation rooms 32 is more than two, some of the sub-accommodation rooms 32 are formed by the adjacent partition walls 124, and the axial guiding protrusions 321 are disposed on two opposite surfaces of the two adjacent partition walls 124.

The inner housing 14 includes a first inner housing element 141 and a second inner housing element 142 (labeled in FIG. 3). The first inner housing element 141 and the second inner housing element 142 have a first hollow cylinder 143 and a second hollow cylinder 144 (labeled in FIG. 3) respectively. As shown in FIG. 3, the inner housing 14 is disposed in the axial accommodation room, wherein the first hollow cylinder 143 faces the first opening 26, and the second hollow cylinder 144 faces the second opening 28. In an embodiment, the second inner housing element 142 can be integrally formed with the main body 12 in the axial accommodation room, and the first inner housing element 141 is placed into the axial accommodation room via the first opening 26 so as to be fixed with the second inner housing element 142. In an embodiment, the first inner housing element 141 and the second inner housing element 142 can be formed separately, and then the first inner housing element 141 and the second inner housing element 142 are assembled and disposed in the axial accommodation room.

Continue with the above description. In an embodiment as shown in FIGS. 1, 2 and 3, each of the sub-accommodation rooms 32 is provided to connect with a double-core optical fiber connector (partially shown in FIG. 4), and therefore, each of the sub-accommodation rooms 32 has two first hollow cylinders 143 arranged one above the other and two second hollow cylinders 144 arranged one above the other. Further, each of the sub-accommodation rooms 32 has two movable shutters 18, 18' and two latch elements 16, 16' to cooperate with the first hollow cylinders 143/the second hollow cylinders 144 arranged one above the other. The movable shutters 18, 18' are vertically symmetrically arranged, and the latch elements 16, 16' are vertically symmetrically arranged. In the following description, the upper movable shutter 18 and the upper latch element 16 are took as an example for the description of the structure and the corresponding configuration, and the lower movable shutter 18' and the lower latch element 16' have the corresponding configurations.

The movable shutter 18 includes a shutter portion 34, a pivot portion 36 and a first interference structure 38. The shutter portion 34 is connected to the pivot portion 36, and the first interference structure 38 is disposed at the pivot portion 36. In an embodiment, the first interference structure 38 includes a protrusion structure 381 formed at the middle position of the pivot portion 36. The two opposite end portions 361 of the pivot portion 36 are respectively placed in the slots 323 of the erection portions 322 on the two sides of the sub-accommodation room 32 via the upper access opening 30, as such the shutter portion 34 is placed between the first hollow cylinder 143 and the first opening 26, as shown in FIG. 3. In an embodiment, the shutter portion 34 is, for example, abutted against the front of the first hollow cylinder 143.

The latch element 16 includes a pushed portion 42, a cantilever portion 44 and a second interference structure 46. The pushed portion 42 is disposed at an end of the cantilever portion 44. In an embodiment, the pushed portion 42 includes two inverted L-shaped structures 421, the bottom surface of the cantilever portion 44 is formed with a shallow trench 441, and a containing space 442 is formed between the cantilever portion 44 and the pushed portion 42. In an embodiment, an axial accommodation slot 443 is formed on the cantilever portion 44, and a block 444 is disposed at an end of the axial accommodation slot 443 adjacent to the pushed portion 42. The second interference structure 46 is disposed at the cantilever portion 44. In an embodiment as shown in FIG. 1, the second interference structure 46 includes, for example, an opening 461 formed at an end of the axial accommodation slot 443 away from the pushed portion 42. As shown in FIGS. 1, 2 and 3, the latch element 16 is disposed on the axial guiding protrusion 321 in the main body 12 via the upper access opening 30, so that the latch element 16 may be slidably disposed along the axial guiding protrusion 321 of the sub-accommodation room 32.

The opening 461 of the cantilever portion 44 of the latch element 16 is sleeved on the protrusion structure 381 of the pivot portion 36 of the movable shutter 18. The latch element 16 can be linearly movable within the sub-accommodation room 32 along the axial guiding protrusion 321, for example, the latch element 16 may move in a direction toward the first opening 26 and a direction toward the second opening 28. A part of the spring 20 is disposed in the axial accommodation slot 443, and an end of the spring 20 can be adjacent to or abutted against the block 444. The spring 20 is compressed as the latch element 16 moves a direction toward the second opening 28.

As shown in FIGS. 1 and 2, the upper cover plate 22 and the lower cover plate 24 are fixed to the main body 12 to respectively cover the upper access opening 30 and the lower access opening. In an embodiment, the upper cover plate 22 has an inner surface 221 facing the upper access opening 30, and the lower cover plate 24 has an inner surface 241 facing the lower access opening. The inner surface 221 of the upper cover plate 22 and the inner surface 241 of the lower cover plate 24 are respectively disposed with two positioning slots 48 (only the positioning slots 48 on the lower cover plate 24 are shown, and the positioning slots 48 on the upper cover plate 22 have the corresponding configuration). The two positioning slots 48 respectively correspond to the positions of the springs 20 located in the two sub-accommodation rooms 32. As the upper cover plate 22 covers the upper access opening 30 and the lower cover plate 24 covers the lower access opening, the latch element 16 and the spring 20 are located between the upper cover plate 22 and the top edge of the inner housing 14, and the latch element 16' and the spring 20' are located between the lower cover plate 24 and the bottom edge of the inner housing 14. The positioning slot 48 has, for example, an arcuate cross section, and preferably the arcuate cross section has an arc greater than a semicircle.

In an embodiment, the top wall 121 of the main body 12 can be disposed with a locking window 57 adjacent to the first opening 26 in response to the connection with the optical fiber connector 50 having a latch. In an embodiment, the locking window 57 may be a square hole or a square notch. In an embodiment, the locking window 57 may be defined by the boundary of the rectangle notch formed by the two inverted L-shaped structures 421 of the latch element 16 and the inner wall of the upper access opening 30. As shown in FIG. 4, the typical optical fiber connector 50 substantially has a rectangular shape. The optical fiber connector 50 includes a hollow and rectangular shell 52. A resilient latch 54 is disposed on the top wall of the shell 52. The optical fiber connector 50 further includes a ferrule 56 located in the shell 52 and extending from a round opening at the front end of the shell 52. As shown in FIG. 4, the latch element 16 moves in a direction toward the second opening 28 and compresses the spring 20 when the pushed portion 42 is pushed by the optical fiber connector 50. Specifically, by the movement of the second interference structure 46 (labeled in FIG. 1) on the latch element 16, the first interference structure 38 is actuated to drive the pivot portion 36 to rotate, and accordingly the shutter portion 34 is deflected away from the first hollow cylinder 143 and accommodated in the containing space 442. In an embodiment in which the second interference structure 46 is the opening 461 and the first interference structure 38 is the protrusion structure 381, the side wall of the opening 461 pushes against the protrusion structure 381 due to the latch element 16 moves in a direction toward the second opening 28, so that the shutter portion 34 is deflected to expose the originally sheltered first hollow cylinder 143. As the ferrule 56 of the optical fiber connector 50 is connected to the first hollow cylinder 143 and the second hollow cylinder 144, the latch 54 interferes with and is clamped in the locking window 57, and the top surface of the optical fiber connector 50 limits the shutter portion 34 within the containing space 442 of the latch element 16.

Continue with the above description. The pushed portion 42 of the latch element 16 is no longer limited by the optical fiber connector 50 when the optical fiber connector 50 and the optical fiber adapter 10 are disconnected from each other. As such, the spring 20 originally limited and compressed by the block 444 of the latch element 16 pushes the latch element 16 to move in a direction toward the first opening 26 by the restoring force, and the shutter portion 34 is deflected back to the front of the first hollow cylinder 143.

Figure 5:
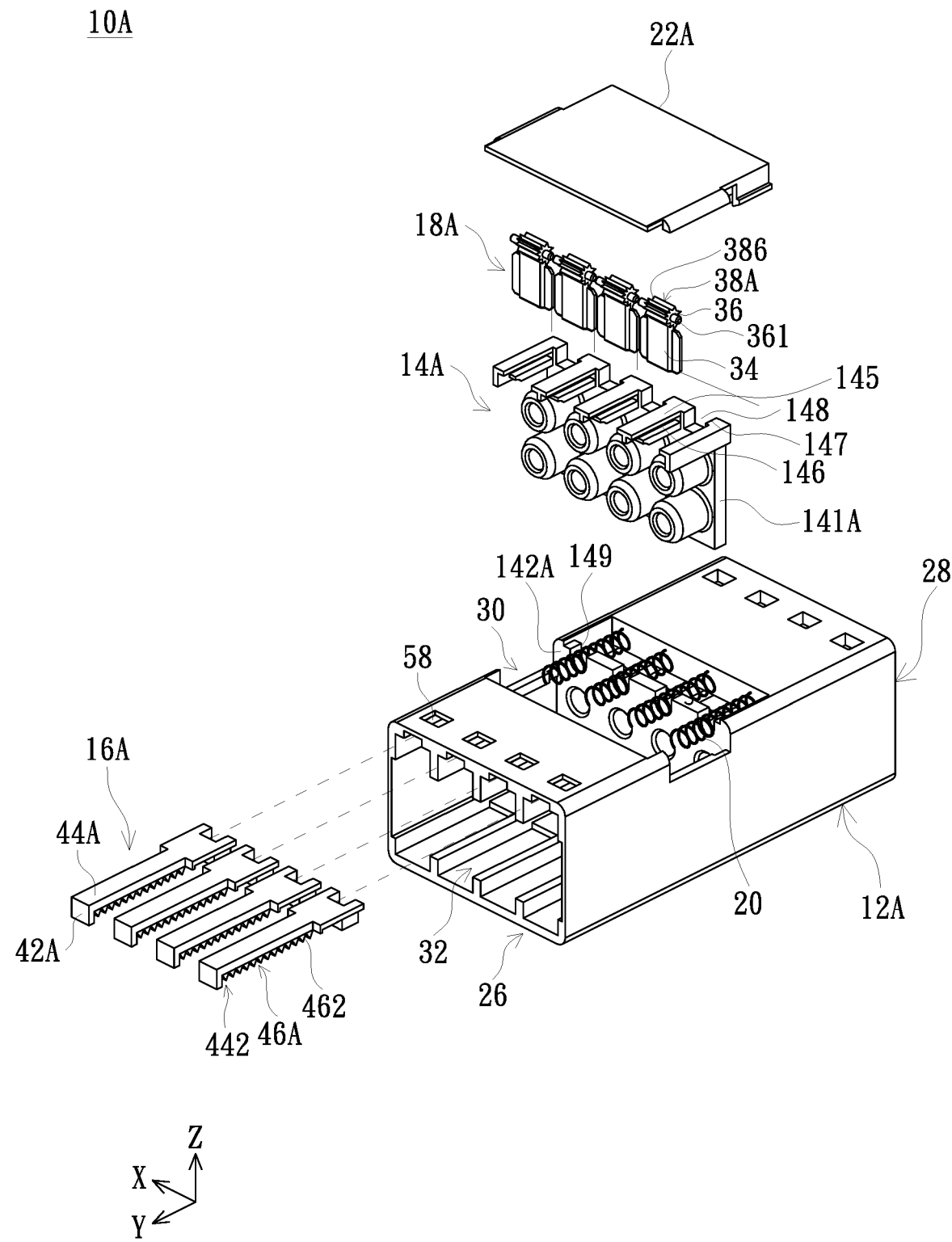
FIG. 5 is a schematic partially perspective exploded diagram of an optical fiber adapter according to a second embodiment of the invention.
Figure 6:
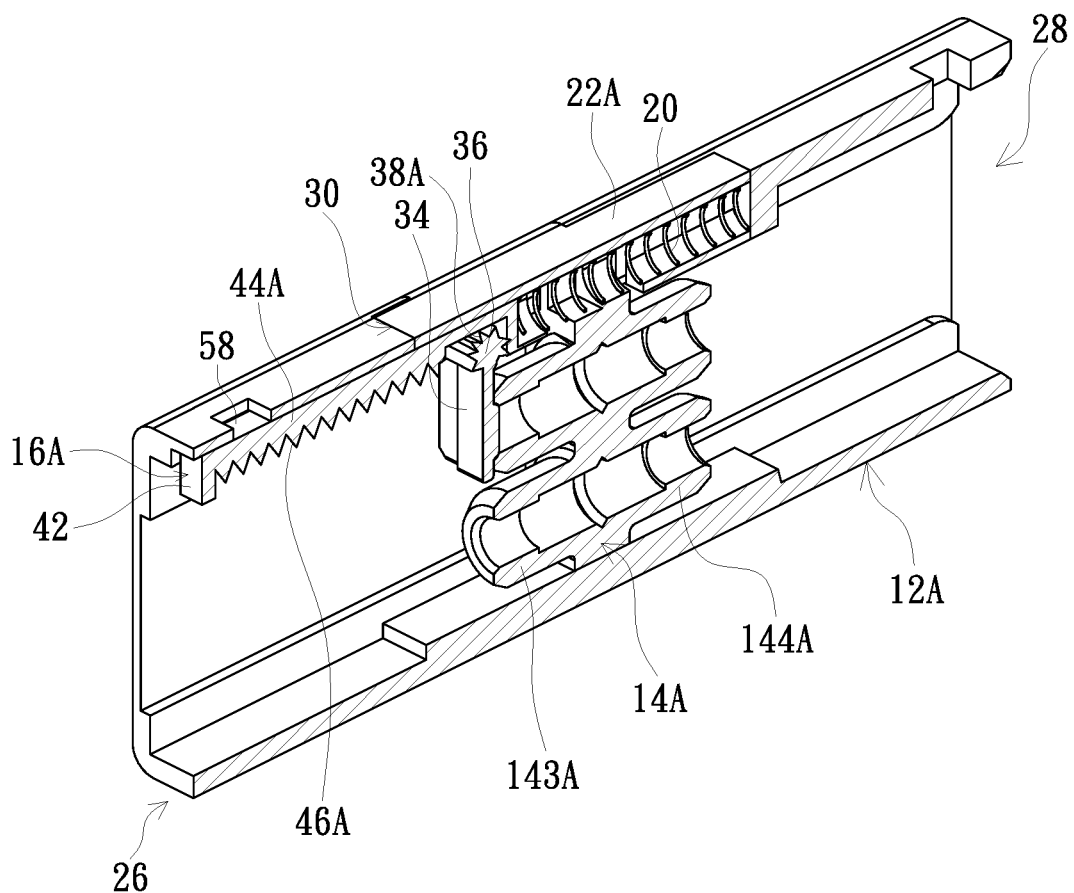
FIG. 6 is a schematic perspective cross-sectional diagram of an optical fiber adapter according to a second embodiment of the invention.
Figure 7:
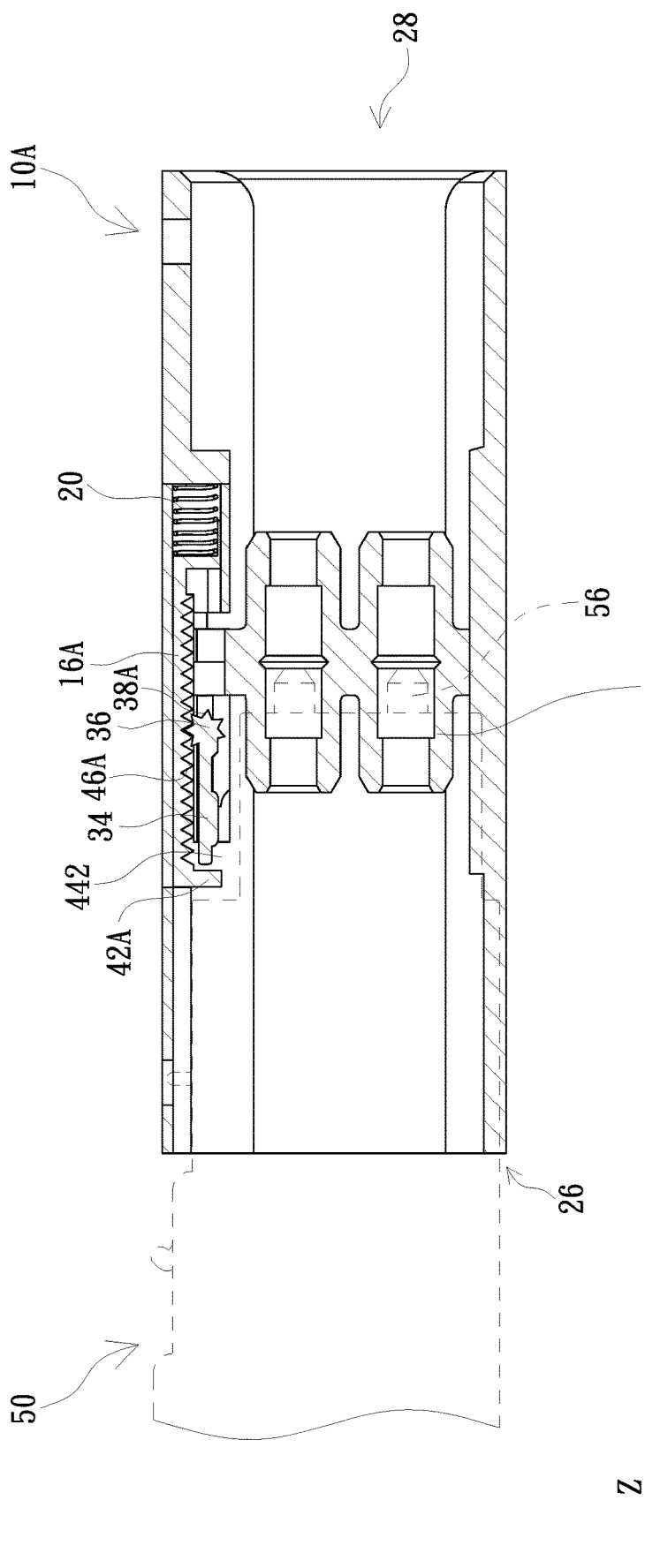
FIG. 7 is a schematic diagram of an optical fiber adapter connected with an optical fiber connector according to a second embodiment of the invention.

FIG. 5 is a schematic partially perspective exploded diagram of an optical fiber adapter according to a second embodiment of the invention. FIG. 6 is a schematic perspective cross-sectional diagram of an optical fiber adapter according to a second embodiment of the invention. FIG. 7 is a schematic diagram of an optical fiber adapter connected with an optical fiber connector according to a second embodiment of the invention. The embodiment shown in FIGS. 5, 6 and 7 only shows the movable shutter, the latch element, the spring and the upper cover plate located in the upper part of the axial accommodation room. It is understood that in order to shelter the first hollow cylinder/the second hollow cylinder located in the lower part of the sub-accommodation room, another set of the movable shutter, the latch element, the spring and the lower cover plate for covering the lower access opening is symmetrically disposed in the lower part of the axial accommodation room. In the following description, the upper movable shutter and the latch element are taken as an example for the description of the structure and the corresponding configuration. As shown in FIG. 5, the optical fiber adapter 10A includes a main body 12A, an inner housing 14A, a latch element 16A, a movable shutter 18A, a spring 20 and an upper cover plate 22A. The embodiment shown in FIG. 5 is illustrated by that the axial accommodation room has four sub-accommodation rooms 32, but the invention is not limited thereto. The top wall 121 of the main body 12A is formed with an upper access opening 30 and a locking window 58.

Please refer to FIGS. 5 and 6 together. The inner housing 14A includes a first inner housing element 141A and a second inner housing element 142A. The inner housing 14A is disposed in the axial accommodation room. The first hollow cylinder 143 faces the first opening 26, and the second hollow cylinder 144 faces the second opening 28. In an embodiment, the first inner housing element 141A and second inner housing element 142A are coupled to each other and disposed in the axial accommodation room. In an embodiment, a plurality of guide portions 145 is horizontally disposed on the top portion of the first inner housing element 141A. The guide portions 145 face the first opening 26 and are spaced from each other. Each two adjacent guide portions 145 has two opposite surfaces. The two opposite surfaces of each two adjacent guide portions 145 are respectively disposed with a guide slot 146. The two opposite surfaces of each two adjacent guide portions 145 are respectively disposed with a block portion 147 adjacent to the second inner housing element 142A. The two block portions 147 of each two adjacent guide portions 145 are opposite to each other and form a first notch 148. Further, the top portion of the second inner housing element 142A is formed with a plurality of second notches 149. The second notches 149 correspond to the first notches 148.

The movable shutter 18A includes a shutter portion 34, a pivot portion 36 and a first interference structure 38. The shutter portion 34 is connected to the pivot portion 36. In an embodiment, the first interference structure 38A includes a gear structure 386 formed on a part of the surface of the pivot portion 36. In an embodiment, the two end portions 361 of the pivot portion 36 of each movable shutter 18A are actuated and respectively placed in the guide slots 146 of the guide portions 145 of the first inner housing element 141A. Therefore, as shown in FIG. 6, the shutter portion 34 is placed in front of a first hollow cylinder 143A and is located between the first opening 26 and the first hollow cylinder 143A.

The latch element 16A includes a pushed portion 42, a cantilever portion 44A and a second interference structure 46A. The pushed portion 42A is disposed at an end of the cantilever portion 44A. In an embodiment, the cantilever portion 44A and the pushed portion 42A are in an inverted L shape, and a containing space 442 is formed between the bottom of the cantilever portion 44A and the pushed portion 42A. In an embodiment, the second interference structure 46A includes a rack structure 462 formed on the bottom surface of the cantilever portion 44A. As shown in FIGS. 5 and 6, the second interference structure 46A (the rack structure 432) is meshed with the first interference structure 38A (the gear structure 386). The spring 20 is placed on the first notch 148 and the second notch 149 corresponding to each other, and the spring 20 is abutted against an end of the cantilever portion 44A. The upper cover plate 22A is fixed to the main body 12A and covers the upper access opening 30, so that the latch element 16A and the spring 20 are located between the upper cover plate 22A and the inner housing 14A.

As shown in FIG. 7, the latch element 16A moves in a direction toward the second opening 28 and compresses the spring 20 when the pushed portion 42A of the latch element 16A is pushed by the optical fiber connector 50. Specifically, by the movement of the second interference structure 46A (the rack structure 432) on the latch element 16A, the first interference structure 38A (the gear structure 386) is actuated to drive the pivot portion 36 to rotate, and accordingly the shutter portion 34 is deflected away from the first hollow cylinder 143A and accommodated in the containing space 442. The pushed portion 42A of the latch element 16A is no longer limited by the optical fiber connector 50 when the optical fiber connector 50 and the optical fiber adapter 10A are disconnected from each other. As such, the spring 20 originally compressed by the latch element 16A pushes the latch element 16A to move in a direction toward the first opening 26 by the restoring force, and the shutter portion 34 is deflected back to the front of the first hollow cylinder 143A.

Figure 8:
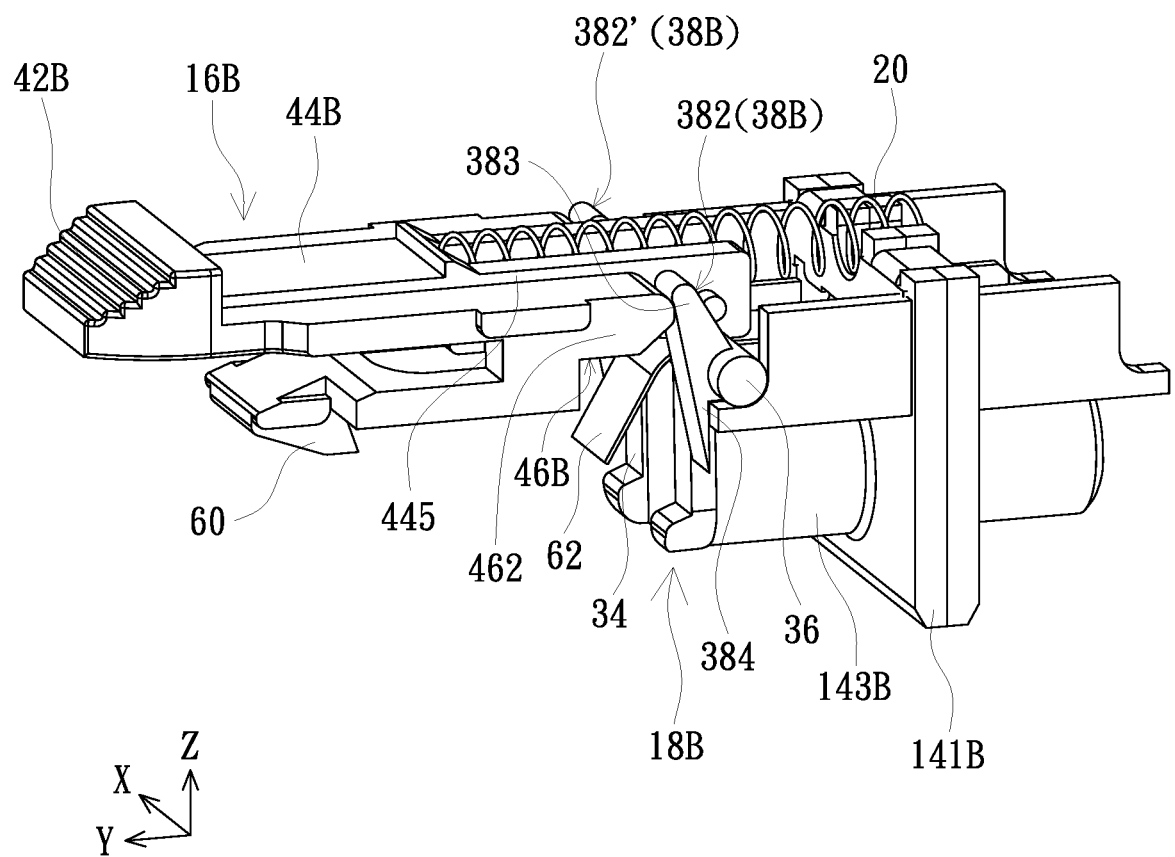
FIG. 8 is a schematic diagram of a latch element and a movable shutter according to an embodiment of the invention.

FIG. 8 is a schematic diagram of a latch element and a movable shutter according to an embodiment of the invention. As shown in the FIG. 8, the latch element 16B includes a pushed portion 42B, a cantilever portion 44B, a second interference structure 46B and a hook portion 60. The hook portion 60 is disposed on the bottom surface of the cantilever portion 44B for interfering and connecting with the optical fiber connector (not shown in the figure). The cantilever portion 44B has two axial side surfaces 445 opposite to each other. In an embodiment, the second interference structure 46B includes two side arms 462 disposed on and protruding from the two axial side surfaces 445 respectively. The movable shutter 18B has a pivot portion 36, a shutter portion 34, a first interference structure 38B and a spring sheet 62. In an embodiment, the first interference structure 38B includes two seesaw members 382, 382' respectively disposed at two opposite ends of the pivot portion 36. Each of the seesaw member 382, 382' is divided into a first section 383 and a second section 384 by the pivot portion 36 as a fulcrum. The first section 383 is abutted against the side arm 462, and the second section 384 is connected to the shutter portion 34. An end of the spring sheet 62 is fixed with the first inner housing element 141B, and another end of the spring sheet 62 is disposed through and located between the shutter portion 34 and the cantilever portion 44B.

In an un-illustrative figure of the invention, the latch element 16B moves and compresses the spring 20 when the pushed portion 42B is pushed by the optical fiber connector. Specifically, the side arm 462 pushes against the first sections 383 of the seesaw members 382, 382', and the second sections 384 of the seesaw members 382, 382' are deflected by the pivot portion 36 as a fulcrum and drive the shutter portion 34 to deflect in a direction toward the cantilever portion 44B, and meanwhile, the spring sheet 62 is abutted and compressed between the cantilever portion 44B and the shutter portion 34. The shutter portion 34 is deflected back to the front of the first hollow cylinder 143B by the restoring force of the spring sheet 62 when the optical fiber connector is disconnected. As such, the shutter portion 34 can be closely and tightly placed in front of the first hollow cylinder 143B by the disposition of the spring sheet 62.

Figure 9:
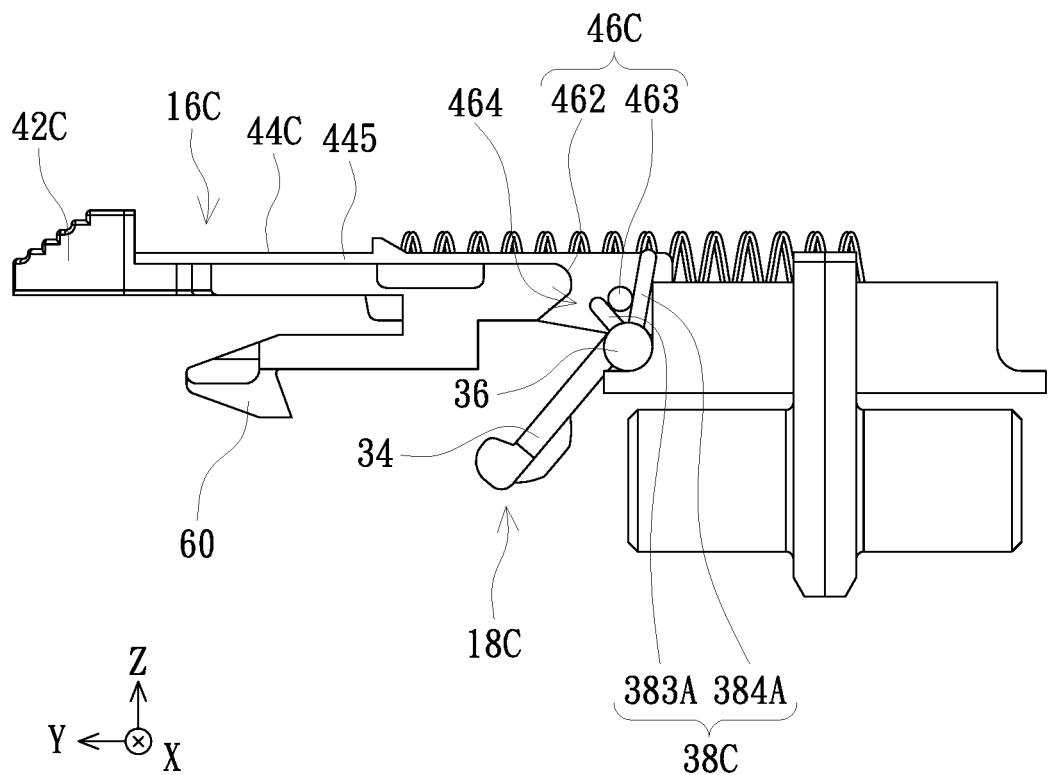
FIG. 9 is a schematic diagram of a latch element and a movable shutter according to another embodiment of the invention.

FIG. 9 is a schematic diagram of a latch element and a movable shutter according to another embodiment of the invention. As shown in FIG. 9, the latch element 16C includes a pushed portion 42C, a cantilever portion 44C, a second interference structure 46C and a hook portion 60. The movable shutter 18C has a pivot portion 36, a shutter portion 34 and a first interference structure 38C. The main difference between this embodiment shown in FIG. 8 and the embodiment shown in FIG. 9 is that the second interference structure 46C in this embodiment includes two side arms 462 and two convex pillars 463 respectively disposed on the two axial side surfaces 445. There is an interval 464 between the convex pillar 463 and the respective side arm 462. Further, the first interference structure 38C includes two interference members respectively disposed at two opposite ends of the pivot portion 36. Each of the interference members includes a first section 383A and a second section 384A. The first section 383A and the second section 384A are connected to each other in a V-shape manner to form a limiting space between the first section 383A and the second section 384A, wherein first section 383A is disposed in the interval 464, and the convex pillar 463 is located in the limiting space.

In the present invention, the latch element is disposed between the main body and the cover plate. The movable shutter can be controlled to be deflected to the containing space of the latch element and expose the hollow cylinder by the linear movement of the latch element in the axial accommodation room, and thereby facilitating the connection with the optical fiber adapter. Further, when the optical fiber connector is disconnected from the optical fiber adapter, the movable shutter returns back to the initial position for to shield the hollow cylinder, so that the high intensity infrared beam is blocked and the visual damage to the user can be avoided. By the design of the latch element having a hook portion, the optical fiber adapter can be connected to a plurality of types of optical fiber connectors, and therefore the practicality of the optical fiber adapter of the present invention is high. That is, the optical fiber adapter can be connected to more types of optical fiber connectors via the latch elements having different structures. Further, by disposing the latch element between the cover plate and the main body, the tightness between the cover plate and the main body can be increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical fiber adapter, adapted to be connected with an optical fiber connector, the optical fiber adapter comprising:
    a main body, having an axial accommodation room, wherein the axial accommodation room is formed by a top wall, a bottom wall and two side walls opposite to each other, the two side walls are connected to the top wall and the bottom wall, two axial ends of the axial accommodation room have a first opening and a second opening respectively, and an upper access opening is formed on the top wall, wherein the top wall of the main body is disposed with at least one partition wall facing the bottom wall to divide the axial accommodation room into a plurality of sub-accommodation rooms, wherein each of the sub-accommodation rooms has two surfaces opposite to each other, two axial guiding protrusions are formed on the two surfaces respectively, two erection portions are disposed on the two axial guiding protrusions respectively, and two slots are formed on the two erection portions respectively;
    an inner housing, disposed in the axial accommodation room, wherein the inner housing comprises a first inner housing element and a second inner housing element, the first inner housing element comprises at least one first hollow cylinder facing the first opening, and the second inner housing element comprises at least one second hollow cylinder facing the second opening;
    at least one movable shutter, comprising a shutter portion, a pivot portion and a first interference structure, wherein the shutter portion is connected to the pivot portion, the first interference structure is disposed at the pivot portion, the pivot portion is rotatably disposed in the axial accommodation room, and the shutter portion is placed between the first hollow cylinder and the first opening, wherein each of the sub-accommodation rooms is disposed with at least one movable shutter, and two opposite end portions of the pivot portion of the movable shutter are actuated and disposed in the slots respectively;
    at least one latch element, comprising a pushed portion, a cantilever portion and a second interference structure, wherein the pushed portion is disposed at an end of the cantilever portion, a containing space is formed between the cantilever portion and the pushed portion, the second interference structure is disposed at the cantilever portion, the latch element is linearly movable and disposed in the axial accommodation room, and the second interference structure and the first interference structure interfere with each other, wherein each of the sub-accommodation rooms is disposed with at least one latch element, and the latch element is actuated and disposed between the two axial guiding protrusions;
    at least one spring, disposed in the axial accommodation room and abutted against the latch element; and
    an upper cover plate, covering the upper access opening.

2. The optical fiber adapter according to claim 1, wherein the latch element moves in a direction toward the second opening and compresses the spring when the pushed portion is pushed by the optical fiber connector, wherein by a movement of the second interference structure on the latch element, the first interference structure is actuated and drives the pivot portion to rotate, so that the shutter portion is deflected away from the first hollow cylinder and accommodated in the containing space.

3. The optical fiber adapter according to claim 2, wherein when the optical fiber connector is disconnected from the pushed portion, the spring pushes the latch element to move in a direction toward the first opening by restoring force thereof, and the shutter portion is deflected back between the first hollow cylinder and the first opening.

4. The optical fiber adapter according to claim 1, wherein the latch element is linearly movable and disposed in the axial accommodation room and between the upper cover plate and the inner housing, the cantilever portion of the latch element is disposed with an axial accommodation slot for accommodating at least a part of the spring, and the spring is located between the upper cover plate and the latch element.

5. The optical fiber adapter according to claim 1, wherein the bottom wall of the main body is further formed with a lower access opening, the optical fiber adapter further comprises a lower cover plate covering the lower access opening, the latch element is linearly movable and disposed in the axial accommodation room and is located between the lower cover plate and the inner housing, the latch element is disposed with an axial accommodation slot for accommodating at least a part of the spring, and the spring is located between the lower cover plate and the latch element.

6. The optical fiber adapter according to claim 1, wherein the upper cover plate has an inner surface facing the upper access opening, at least one positioning slot is formed on the inner surface of the upper cover plate and corresponding to a position of the spring, and the upper cover plate covers the upper access opening and accommodates the spring by the positioning slot.

7. The optical fiber adapter according to claim 1, wherein the first interference structure comprises a protrusion structure formed on the pivot portion, the second interference structure comprises an opening formed on the cantilever portion, the protrusion structure passes through the opening, and at least one inner wall of the opening interferes with the protrusion structure.

8. The optical fiber adapter according to claim 1, wherein the first interference structure comprises a gear structure formed on at least a part of the pivot portion, the second interference structure comprises a rack structure formed at the cantilever portion, and the rack structure is meshed with the gear structure.

9. The optical fiber adapter according to claim 1, wherein the cantilever portion of the latch element has two axial side surfaces opposite to each other, the second interference structure comprises two side arms disposed on and protruding from the two axial side surfaces respectively, the first interference structure comprises two seesaw members disposed at two opposite ends of the pivot portion respectively, each of the seesaw members is divided into a first section and a second section by the pivot portion as a fulcrum, the first section abuts against the side arm, and the second section is connected to the shutter portion.

10. The optical fiber adapter according to claim 9, wherein the latch element further comprises a spring sheet disposed in the axial accommodation room, and a part of the spring sheet is disposed through and located between the shutter portion and the cantilever portion.

11. The optical fiber adapter according to claim 1, wherein the cantilever portion of the latch element has two axial side surfaces opposite to each other, the second interference structure comprises two side arms and two convex pillars, each of the axial side surfaces is disposed with the side arm and the convex pillar, an interval is formed between the convex pillar and the respective side arm, the first interference structure comprises two interference members disposed at two opposite ends of the pivot portion respectively, each of the interference members comprises a first section and a second section, the first section and the second section are connected to each other in a V-shape manner to form a limiting space between the first section and the second section, the first section is disposed in the interval, and the convex pillar is located in the limiting space.

12. The optical fiber adapter according to claim 1, wherein the top wall of the main body is disposed with at least one locking window adjacent to the first opening, and the at least one locking window is adapted to connect and interfere with the optical fiber connector.

13. The optical fiber adapter according to claim 1, wherein at least one hook portion is formed on the cantilever portion of the latch element, and the at least one hook portion is adapted to connect and interfere with the optical fiber connector.

14. The optical fiber adapter according to claim 1, wherein quantities of the first hollow cylinders and the second hollow cylinders are plural, each of the sub-accommodation rooms is respectively disposed with at least one first hollow cylinder and at least one second hollow cylinder, quantities of the latch elements and the movable shutters are plural, a quantity of the springs is plural, and the springs are disposed in the sub-accommodation rooms respectively for abutting against the latch elements respectively.

15. The optical fiber adapter according to claim 14, wherein a plurality of guide portions are disposed parallel on a top portion of the first inner housing element, the guide portions face the first opening and are spaced from each other, each two adjacent guide portions has two opposite surfaces, and a guide slot is disposed on the two opposite surfaces respectively, wherein two ends of the pivot portion of each of the movable shutters are actuated and disposed in the guide slots respectively, and the latch element is actuated and disposed between the two adjacent guide portions.

16. The optical fiber adapter according to claim 15, wherein a block portion is respectively disposed on the two opposite surfaces of each two adjacent guide portions and adjacent to the second inner housing element, the two block portions of each two adjacent guide portions are opposite to each other to form a first notch, and a top portion of the second inner housing element is formed with a plurality of second notches, the second notches correspond to the first notches, wherein the spring is placed on the first notch and the second notch corresponding to each other, and the spring is abutted against the latch element.

* * * * *